United States Patent
Moss et al.

(10) Patent No.: US 7,623,638 B2
(45) Date of Patent: *Nov. 24, 2009

(54) METHOD AND SYSTEM FOR PROVIDING ENHANCED CALLER IDENTIFICATION INFORMATION INCLUDING SCREENING INVALID CALLING PARTY NUMBERS

(75) Inventors: John Wesley Moss, Lake Zurich, IL (US); James Daniel Kovarik, Batavia, IL (US); Kenneth Robert Stroud, Lago Vista, TX (US); Rick Anthony Cherye, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/366,270

(22) Filed: Mar. 2, 2006

(65) Prior Publication Data

US 2006/0147004 A1    Jul. 6, 2006

Related U.S. Application Data

(63) Continuation of application No. 10/024,645, filed on Dec. 14, 2001, now Pat. No. 7,068,767.

(51) Int. Cl.
*H04M 1/56* (2006.01)
*H04M 15/06* (2006.01)

(52) U.S. Cl. .............................. 379/142.01; 379/88.19; 379/88.21

(58) Field of Classification Search ................................. 379/142.01–142.06, 142.15, 142.17, 142.18, 379/88.19–88.21, 93.23, 188, 201.1, 201.11, 379/207.13, 210.02, 210.03, 211.01, 221.08
See application file for complete search history.

(56) References Cited

U.S. PATENT DOCUMENTS

| 5,497,414 | A | * | 3/1996 | Bartholomew | ......... 379/142.02 |
| 5,905,774 | A | * | 5/1999 | Tatchell et al. | ......... 379/88.04 |
| 6,160,876 | A | * | 12/2000 | Moss et al. | ......... 379/142.02 |
| 6,816,581 | B1 | * | 11/2004 | Simpson et al. | ........ 379/211.02 |
| 7,068,767 | B2 | * | 6/2006 | Moss et al. | ......... 379/142.01 |

* cited by examiner

*Primary Examiner*—Quoc D Tran
(74) *Attorney, Agent, or Firm*—Cantor Colburn LLP

(57) ABSTRACT

A system and method deliver audible caller identification information when standard Caller ID information is invalid or can not be provided. In one disclosed embodiment, the Caller ID information must include a valid number of digits and a valid area code. If the Caller ID information is not valid, a calling party is prompted by an announcement to provide the audible caller identification information.

12 Claims, 3 Drawing Sheets

METHOD AND SYSTEM FOR PROVIDING ENHANCED CALLER IDENTIFICATION INFORMATION INCLUDING SCREENING INVALID CALLING PARTY NUMBERS

RELATED APPLICATIONS

The present application is a continuation of application Ser. No. 10/024,645, filed Dec. 14, 2001 now U.S. Pat. No. 7,068,767, which is hereby incorporated herein by reference.

BACKGROUND

The present invention relates generally to telecommunications services. More particularly, the present application relates to a method and system for providing enhanced caller identification information including screening invalid calling party numbers.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. This may occur, for example, if the calling party pressed *67 when initiating the call.

When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

Patent application Ser. No. 09/122,484, filed Jul. 24, 1998 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999, is also incorporated herein by reference. This application discloses a method for providing enhanced caller identification information when per line blocking of Caller ID is present. When per line blocking is activated for a subscriber line, the Caller ID information for that line is never transmitted by the system.

In the systems disclosed in the incorporated patent applications, subscribers that interface with network equipment via Primary Rate Interface Trunk Groups have the ability to illegally manipulate the ten digit directory number that is placed in the Calling Party ID field of the set up message that is communicated by the network. Instead of the true calling party information, such subscribers can place, for example, all zeroes, all ones, numbers having fewer than ten digits, ten digit numbers that begin with a 0 or 1. Alternatively, such callers can place an invalid Numbering Plan Area (NPA) or area code number, plus seven digits, in the Calling Party ID field.

In any of these cases, and by not blocking the entry by setting the entry to presentation allowed, the call will bypass the system of the incorporated patent applications and will be presented to the called party. Subscribers to the service will see displayed on their Caller ID equipment the phony directory number and an unknown name. This shields the identity of the calling party from the service subscriber.

Accordingly, there is a need for a system and method which permit detection and screening of invalid calling party numbers before the call is communicated to the called party.

DETAILED DESCRIPTION OF THE DRAWINGS AND THE PRESENTLY PREFERRED EMBODIMENTS

By way of introduction, the preferred embodiments below include a method and system for providing a called party with audible caller identification information when standard caller identification information cannot be provided. In one embodiment, calls for which standard caller identification information is blocked, unavailable or incomplete are prevented from being connected to the called party. The directory number of the calling party is analyzed to determine if it is a valid number. If the directory number is invalid, the call will be treated as if the calling party information is unavailable. A forward call message is transmitted with the directory number of the called party contained in a normally unused data field. A presentation indicator for the directory number is set in the forward call message to presentation allowed so that blocking of the called party's identification information does not occur.

In response to the forward call message, a request for audible caller identification information is transmitted to the calling party. If the calling party provides the requested audible caller identification information, the audible information is transmitted to the called party. Caller identification information can thus be provided to the called party when standard caller identification information cannot be provided.

Figure 1:
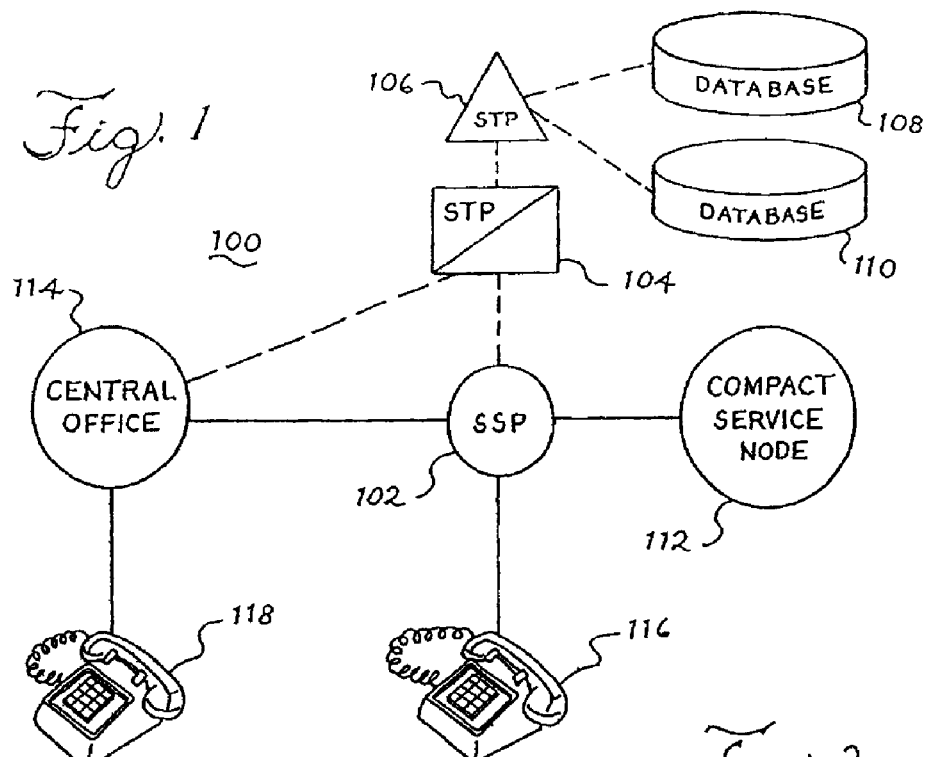
FIG. 1 is a block diagram of a telecommunications system.

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116 and calling telephone station 118. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information. SSP 102 connects called telephone station 116 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 106 and receives and responds to responses to the queries returned from SCP 106. In the illustrated embodiment, communication between the SSP 102 and the SCP 106 employs Transaction Capabilities Applications Protocol or TCAP.

STP 104 preferably comprises a network element that transfers signaling communications in response to signaling protocols such as SS7 or other such signaling protocols as presently known to those skilled in the art or developed in the future. STP 104 preferably transfers queries from SSP 102 to SCP 106 and transfers responses to the queries from SCP 106 to SSP 102.

SCP 106 preferably comprises an AIN element that stores account information, call information and receives and responds to queries. SCP 106 preferably stores account information about a called party's account as well as call control information in the first SCP database 108 and can access the stored information. SCP 106 also stores standard caller identification information in the second SCP database 110 and can access the stored caller identification information. SCP 106 receives queries generated by SSP 102 and preferably responds to the queries by performing database searches to locate the requested call control or account information or caller identification information as known to those skilled in the art. SCP 106 can forward the call control or account information or caller identification information to SSP 102.

CSN 112 preferably comprises a network element that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. These components and others which are operationally equivalent may be substituted for the CSN 112 in FIG. 1.

Database 108 preferably comprises a data storage element for use with SCP 106 as known to those skilled in the art. Database 108 preferably stores account and call control information that can be implemented by SSP 102 to control calls. Such account and call control information is known to those skilled in the art.

Database 110 preferably comprises a standard caller identification with name database as known to those skilled in the art. When the information is available in the system, database 110 typically includes the name of the person associated with calling telephone station 118, along with the telephone number that is associated with calling telephone station 118. Database 110 can alternatively comprise a caller assistance database as known to those skilled in the art. While databases 108, 110 are depicted within a telecommunications system, databases 108, 110 can comprise any suitable databases containing information adapted for use in the present embodiment and are not limited to databases located within a telecommunications network. It is also important to note that while databases 108, 110 are shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise analog telephone sets as known to those skilled in the art. Alternatively, telephone stations 116, 118 can comprise wireless, PCS, ISDN or any other form of communication station known to those skilled in the art. Called telephone station 116 preferably includes CPE equipment for use with caller identification services as known to those skilled in the art.

Figure 2:
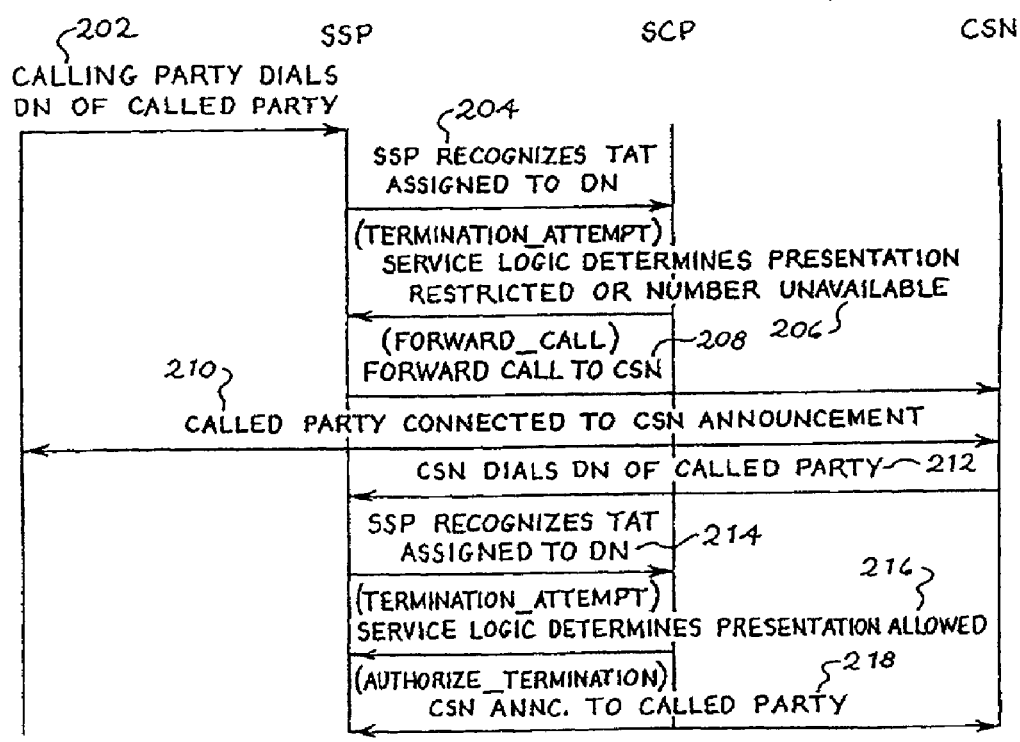
FIG. 2 is a call flow diagram illustrating a method for processing a call in the telecommunications system of FIG. 1.

FIG. 2 is a call flow diagram illustrating a method for processing a call in the telecommunication system 100 of FIG. 1. FIG. 2 illustrates communication between SSP 102, SCP 106 and CSN 112 for processing the call.

At step 202, the calling party at the calling telephone station 118 calls the directory number (DN) of the called communication station 116. The calling party may choose to enable Calling Number Delivery Blocking, for example, by dialing *67 before dialing the DN of the called communication station 116. This will block delivery of the standard caller ID information for the calling telephone station 118. In some systems, portions of the telecommunications system 100 such as the trunk group terminating the call may not pass the standard Caller ID information.

At step 204, the terminating SSP 102 recognizes that a terminating attempt trigger (TAT) is assigned to the called directory number. In response to the TAT, the SSP 102 creates a Termination_Atttempt query message and transmits the query message to the SCP 106 for analysis. In the illustrated embodiment using AIN elements, the query message is formatted according to AIN Release 0.1 TCAP. The query message includes several parameters as is known to those ordinarily skilled in the art. For the Termination_Atttempt query message, the following parameters are specified:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of Called DN |
| TriggerCriteriaType | 15 (terminating attempt) |
| CalledPartyStationType | Originating Line Information of the Called DN |
| ChargeNumber | ANI of the originating facility or ANI of last forwarding station, if available |
| CallingPartyID | DN of the calling party (if available) |
| Presentation Restriction | 01 (Presentation Restricted) |
| | 10 (Number Unavailable) |
| | 00 (Presentation allowed) |
| ChargePartyStationType | Originating Line Information of the calling DN |
| OriginalCalledPartyID | First party that redirected the call |
| RedirectingPartyID | Last party that redirected the call |

If the calling party has blocked the standard Caller ID information, or if the system does not pass the standard Caller ID information for the calling communication station, the CallingPartyID parameter of the TAT query message will not be available. The Presentation Restriction Indicator parameter will be set to one of the binary values 01 or 10 to indicate this condition. This is in contrast to the situation in which the standard Caller ID information is available and the Presentation Restriction Indicator parameter is set to 00, to indicate presentation allowed.

In response to the Termination_Attempt query, the SCP 106 will validate the Presentation Restriction Indicator parameter of the CallingPartyID parameter. If the indicator is set to Presentation Restriction (01) or Number Unavailable (10), the SCP 106 will pass routing information to the SSP 102 in a Forward_Call response message, step 206. Further in response to the Termination_Attempt query, the SCP 106 will determine if the called party has set called party requirements for tailoring a request message to be sent to the calling party. In one embodiment, if the message has a presentation restriction set to 00 or presentation allowed, the SCP 106 will ensure that the calling directory number is valid. A variety of validity checks can be performed, including those described below in conjunction with FIGS. 3 and 4. In another embodiment, the SCP 106 will examine account information stored at the database 108. If the account information contains a special designator indicating that the called party has specified a customer selected request message should be used for the request message, the SCP 106 will pass call control information in the Forward_Call response message indicating this to the SSP 102.

In the illustrated embodiment using AIN elements, the response message is formatted according to AIN Release 0.1 TCAP. The response message includes several parameters as is known to those ordinarily skilled in the art.

In a first embodiment, for the Forward_Call query message, the following parameters are specified:

| | |
|---|---|
| CallingPartyID | DN to which the TAT is assigned (Called DN from the Termination_Attempt query with presentation allowed) |
| CalledPartyID | Lead DN from the ISDN trunk group connecting the CSN; customer-selected language or format option |
| PrimaryCarrier | 0110 (LEC) |
| AMAslpID | 008780000 (uniquely identifies a service and indicates flat rate) |

Thus, in this first embodiment, the SCP 106 detects the CalledPartyID parameter of the Termination_Attempt query received from the SSP 102. As noted above, this parameter is set to the DN of the called party, or the directory number of the called telephone station. The SCP 106 places this value in the Forward_Call response for the CallingPartyID parameter. The CallingPartyID parameter of the Forward_Call response has an associated Presentation Restriction Indicator parameter. The SCP 106 marks this Presentation Restriction Indicator as presentation allowed. The SCP 106 sets a parameter in the call forward message indicating that a customer selected request message may be used for the input. To indicate the customer-selected language or format option, an existing parameter of the Forward_Call query message is set to a predetermined value. For example, this information may be incorporated in spare bits such as the last five digits of the CalledPartyID. Any other suitable parameter may be used for passing this information.

In a second embodiment, a different parameter is used in the Forward_Call response message for communicating the called telephone station's DN. This parameter is the RedirectingPartyID. In this embodiment, the SCP 106 places the CalledPartyID DN from the Termination_Attempt query message into the RedirectingPartyID of the Forward_Call response message. The RedirectingPartyID has an associated Presentation Restriction Indicator parameter. The SCP 106 sets the associated Presentation Restriction Indicator parameter to presentation allowed. In this embodiment, the Forward_Call query message has parameters specified as follows:

| | |
|---|---|
| CallingPartyID | DN of the Calling Party (if available) |
| CalledPartyID | Lead DN from the ISDN trunk group connecting the CSN |
| PrimaryCarrier | 0110 (LEC) |
| RedirectingPartyID | DN to which the TAT is assigned (Called DN from the termination_attempt query) with presentation allowed (overwrites redirection information that the SSP would normally provide); customer-selected language or format option |
| AMAslpID | 008780000 (uniquely identifies a service and indicates flat rate) |

To indicate the customer-selected language or format option, an existing parameter of the Forward_Call query message is set to a predetermined value. For example, in this second embodiment, this information may be incorporated in spare bits such as the last five digits of the RedirectingPartyID. Any other suitable parameter may be used for passing this information.

At step 208, the SSP 102 receives the Forward_Call response message and originates a new call for the forwarded leg. The SSP 102 merges the new originating call and the existing terminating call. That is, the SSP 102 bridges or reconfigures the call. At this point, the SSP 102 routes the call as if it received an Analyze_Route message, using the CalledPartyID in the Forward_Call message to identify the new party. In the first embodiment described above, the CallingPartyID is the DN to which the termination attempt trigger is assigned. In the second embodiment, the redirecting number is the DN to which the termination attempt trigger is assigned. The SSP 102 forwards the call to the CSN 112.

At step 210, the forwarded call is answered by the CSN 112. The CSN 112 is operative to generate an announcement that is transmitted to the calling telephone station 118. In the illustrated embodiment, the announcement is a request which is tailored according to called party requirements. One example of a suitable announcement is "The party you are calling does not accept calls from unidentified numbers. At the tone, say your name or the company you represent and your call will be completed." This may be the default message. In another example, at the request of the customer or called party, announcements played to parties calling the called party may be played in another language such as Spanish or may be sent to the calling party as text data or TDD data. Further, if the called communication station is a business line, a message more suitable for a business customer of the called party may be played rather than the default message, which may be suitable for a residence telephone. In another example, announcements, prompts or notifications played to the called party may be tailored to vary from default message at the customer's request. Non-default messages are specified by the customer at the time the service is initiated. The nature of the message is set by the parameter received in the call forward message.

After transmission of the announcement to the calling party, the CSN 112 then detects a response. If the calling party provides a response, the response is recorded as audible caller identification information for subsequent playback to the called party. If no response is provided, the call is terminated.

At step 212, the CSN 112 originates a new call to the called telephone station 116. In the first embodiment described above, the CSN 112 originates the new call to the DN found in the CallingPartyID parameter of the Forward_Call response message. The parameter was set to the DN to which the TAT is assigned. In the second embodiment described above, the CSN 112 originates the new call using the DN found in the RedirectingPartyID parameter of the Forward_Call response message. The parameter was set to the DN to which the TAT is assigned.

At step 214, the SSP 102 recognizes that a terminating attempt trigger (TAT) is assigned to the called DN. Based on the TAT, the SSP 102 creates a termination_attempt query message and transmits the query message to the SCP 106 for analysis. The parameters required for the AIN release 0.1 TCAP query message in the illustrated embodiment are as follows:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of the Called DN |
| TriggerCriteriaType | 15 (Termination Attempt) |
| CalledPartyStationType | Originating Line information of the called DN |
| ChargeNumber | ANI of the originating facility |
| CallingPartyID | DN of the calling party (CSN DN) |
| Presentation Restriction | 00 (Presentation Allowed) |
| ChargePartyStationType | Originating Line information of the calling DN |

At step 216, the service logic of the SCP 106 will validate the Presentation Restriction Indicator of the CallingPartyID parameter of the query message. If the indicator is equal to Presentation Allowed, the SCP 106 will create an Authorize_Termination response message and send it to the SSP 102. The parameters required for the AIN release 0.1 TCAP response message in the illustrated embodiment are as follows:

| | |
|---|---|
| CallingPartyID | DN of the calling party (CSN DN) |
| ChargeNumber | ANI of the calling party |
| ChargePartyStationType | Originating Line information of the calling DN |
| DisplayText | CNAME information |

At step 218, when the called party answers the called telephone station 116, in the illustrated embodiment the CSN 112 first plays an identifying message and requests a keypress input. This ensures that a human is present to answer the called telephone station 116 and distinguishes the case where a modem, fax or other equipment answers the called telephone station 116. The identifying message may be in a language or format specified by the customer or called party at the time the service is ordered. If the called party accepts the call, the CSN 112 connects the original calling party at the calling telephone station 118 to the called party at the called telephone station 116.

Figure 3:
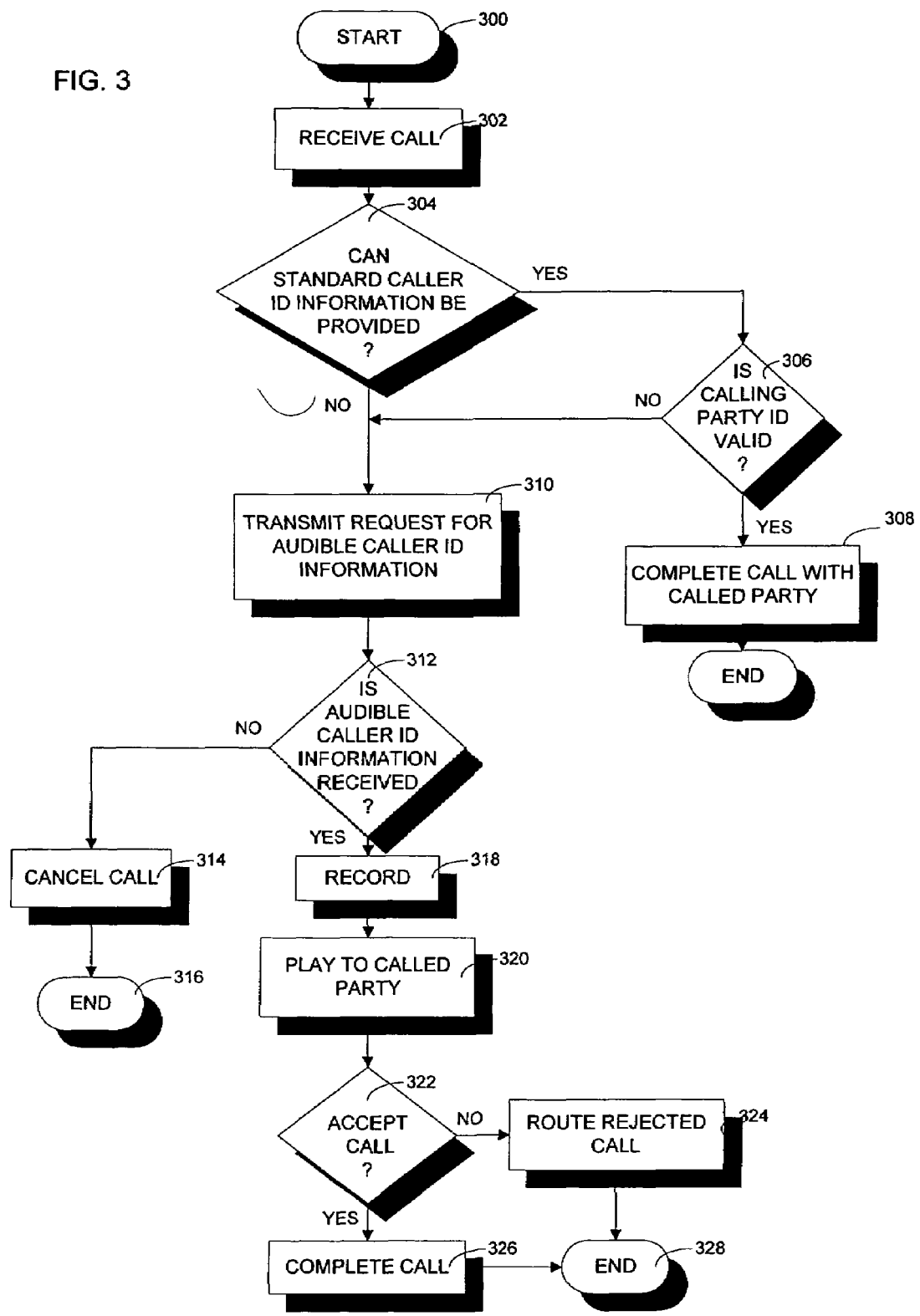
FIG. 3 is a flow diagram illustrating one embodiment of a method for inhibiting originating customers from bypassing a privacy management method and system of FIGS. 1 and 2.

FIG. 3 is a flow diagram illustrating one embodiment of a method for inhibiting originating customers from bypassing the privacy management service and system illustrated above in conjunction with FIGS. 1 and 2. The method begins at block 300. At block 302, an originating call is received. In one embodiment, this operation may correspond to receiving the call from a calling communication station at a central office or SSP. In response to the received call, a terminating attempt trigger is generated and communicated to a SCP.

At block 304, it is determined if the standard caller identification information for the calling party can be presented. The SCP determines if the call is received with presentation unavailable or presentation allowed. If the call is marked presentation unavailable, control proceeds to block 310. If the call is marked presentation allowed, at block 306 the SCP determines if the calling party directory number is a valid number. In an AIN implementation, when the TAT trigger is received, the contents of the Calling Party ID field are examined to determine if the data in that field correspond to a valid directory number. The operation of block 306 will be described in greater detail below in conjunction with FIG. 4.

If the calling party directory number is valid, at block 308 the call is completed normally. That is, the Calling Party ID is provided to the called communication station in accordance with normal caller ID operation. If a name and number delivery service is available, data corresponding to the name of the calling party is also retrieved from storage in the SCP database or other storage location and communicated to the called communication station.

If the calling party directory number is not valid, the call is treated as if the calling party was unavailable, or as if the call was marked presentation unavailable. At block 310, the call is forwarded to the CSN or other network equipment and the calling party is connected to an announcement played by the CSN. In one embodiment, the calling party is advised that the called party does not accept telemarketing calls and is prompted to state the calling party's name or to provide other audible caller identification information.

At block 312, the CSN or other network equipment determines if audible caller identification is received from the calling party. If not, at block 314 the call is cancelled and the call ends at block 316, or the call is otherwise suitably processed. If the audible caller identification is received, it is recorded at block 318. At block 320, the audible caller identification information is provided to the called party, for example, by replaying the recorded information.

At block 322, the called party is given an opportunity to accept the call after hearing the audible caller identification information. If the called party does not accept the call, at block 324 the call is routed accordingly. For example, the called party may reject the call or send the call to voice mail for further processing. If the call is accepted by the called party at block 322, at block 326 the call is completed between the calling communication station and the called communication station. The method ends at block 328.

Figure 4:
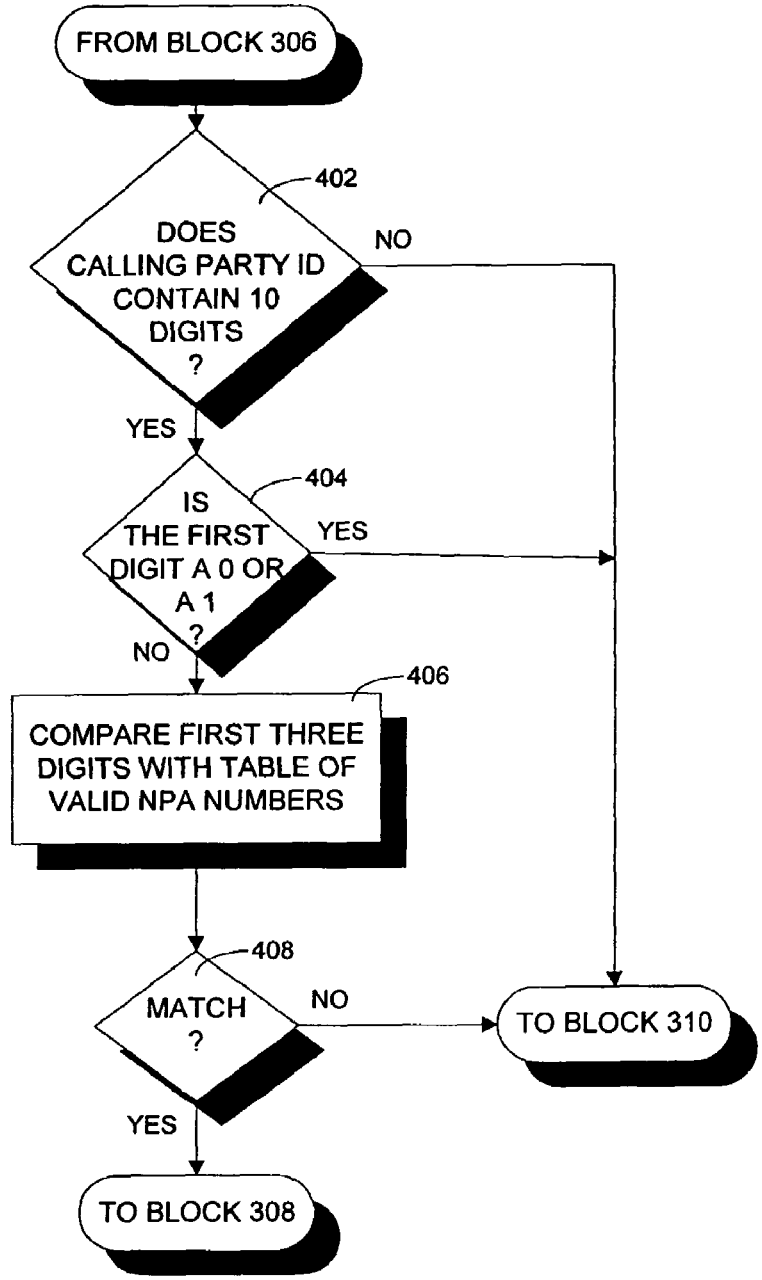
FIG. 4 is a flow diagram illustrating a portion of the method of FIG. 3 in greater detail.

FIG. 4 is a flow diagram illustrating in greater detail one embodiment of a method for determining if calling party identification information is valid for a received call. The method acts illustrated in FIG. 4 may be embodied as software or other program code stored and processed at the SCP. After processing block 304 (FIG. 3), control proceeds to block 402 in the embodiment of FIG. 4. FIG. 4 illustrates one set of tests to determine if the calling party identification information received from the calling communication station is valid. Other test may be performed instead or in addition to any one or more of the tests illustrated in FIG. 4. However, the tests illustrated in FIG. 4 have been determined to catch the bulk of phony directory numbers submitted by a calling party in an attempt to bypass the service shown in FIG. 3.

At block 402, it is determined if the calling party identification information contains 10 digits. It is assumed that the calling party identification will be a directory number of the form NPA-NXX-XXXX. NPA or Numbering Plan Area is a three digit number corresponding to the originating area code. These are assigned by an industry organization. Only a limited number of NPA values are permitted in accordance with industry standards. Some three digit combinations are invalid or not yet assigned. NXX is the local central telephone office code. XXXX is the individual subscriber's number. In alternative systems, other numbering schemes and numbers of digits may be used and the act of block 402 may be adapted to accommodate these variations. Counting the number of digits provides one coarse check on the validity of the calling party identification information. If the test of block 402 fails and the Calling Party ID contains other than 10 digits, the call will be treated as if the calling party was unavailable (presentation unavailable). Control proceeds to block 310, FIG. 3.

Otherwise, control proceeds to block 404 and the service logic of the SCP or other equipment will inspect the first digit of the Calling Party ID. Again, it is assumed that the NPA-NXX-XXXX convention is used. According to this convention, NPA numbers must begin with any number between 2 and 9 inclusive. If the first digit is a 0 or a 1, the Calling Party ID is not a valid telephone number. If the first digit is a 0 or 1, the call will be treated as if the calling party was unavailable (presentation unavailable). Control then proceeds to block 310, FIG. 3. Again, if other rules or conventions specifying the position and content of valid numbers are in place, the illustrated tests may be adapted to reflect these rules or conventions.

Otherwise, control proceeds to block 406. At block 406, the first three digits of the Calling Party ID or the NPA are compared with the contents of a Valid NPA Table. This table may be stored at the SCP database, for example, or any other convenient location. This table stores a list of valid NPA numbers or telephone area codes. As noted above, only a limited number of NPA numbers have been adopted. At block 408, it is determined if the first three digits of the Calling Party ID match a valid NPA from the Valid NPA Table. If not, the call will be treated as if the calling party was unavailable (presentation unavailable). Control proceeds to block 310, FIG. 3. In all cases where the calling party is treated as unavailable, the call will be intercepted before completion to the called party. The calling party will be requested to state a name or otherwise provide audible caller identification information, or enter an access code. If the first three digits match a valid NPA, control proceeds to block 308, FIG. 3, and the call is completed to the called party.

As can be seen from the foregoing, the present embodiments provide a system and method for delivering audible caller identification information when standard Caller ID information can not be provide. The calling party identification information is tested to ensure that the calling party identification represents a valid directory number. An SCP performs one or more validity tests on the calling directory number. If an invalid directory number is detected, the SCP routes the call to a service which requires that the calling party state a name for playback to the called party or enter an access code. The SCP detects the directory number to which a terminating attempt trigger is assigned and places this directory number in a parameter for transmission to the SSP using a forward_call message. The SCP prompts the calling party to provide audible caller identification information. The called party is then advised of the incoming call. In this manner, callers who seek to bypass the privacy management service used by subscribers are blocked before completion of the call.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for processing a call from a calling party at a calling communication station to a called party at a called communication station in a telecommunications network including at least one switch and a telephony database, the method comprising:
    receiving the call from the calling communication station at a switch;
    transmitting a termination attempt query from the switch;
    communicating the termination attempt query to a telephony database,
        wherein the telephony database is configured to:
        determine whether caller identification information contained within in the termination attempt query is valid;
        determine whether standard caller identification information for the calling communication station can be provided to the called communication station;
        identify the call as presentation unavailable, if either the standard caller identification information or the caller identification information is unavailable;
    receiving a forward call message at the switch, when the call is identified as presentation unavailable, wherein the forward call message includes a presentation indicator associated with the called communication station, and a parameter indicating that a selected request message should be used for the request;
    originating a second call at the switch that requests audible caller identification information in accordance with the customer selected request message; and
    transmitting, in connection with the second call, the audible caller identification information to the called communication station in a format specified by the called party.

2. The method of claim 1, wherein the telephony database is further configured to determine if the Numbering Plan Area (NPA) of the caller identification information is invalid.

3. The method of claim 2, wherein the telephony database is further configured determine if the Numbering Plan Area (NPA) of the caller identification information is an approved NPA number.

4. The method of claim 3, wherein the telephony database is further configured determine if the Numbering Plan Area (NPA) of the caller identification information starts with a first digit set to a 0 or a 1.

5. The method of claim 1, wherein the telephony database is further configured determine if the caller identification contains a valid number of digits.

6. The method of claim 5, wherein the telephony database is further configured to determine whether the caller identification contains ten digits.

7. A method for processing a call from a calling party at a calling communication station to a called party at a called communication station in a telecommunications network including at least one switch and a telephony database, the method comprising:

receiving the call from the calling communication station at a switch;

transmitting a termination attempt query from the switch;

communicating the termination attempt query to a telephony database, wherein the telephony database is configured to:

detect in the termination attempt query the caller identification information for the calling communication station;

determine whether the caller identification information is valid;

process, if the caller identification information is not valid, the call as if the call is marked presentation unavailable;

determine whether standard caller identification information for the calling communication station can be provided to the called communication station;

identify the call as a presentation unavailable call, if the standard caller identification information for the calling communication station cannot be provided;

receiving a forward call message at the switch for calls identified as presentation unavailable calls, wherein the forward call message includes:

an identifier associated with the called communication station;

a presentation indicator associated with the called communication station, the presentation indicator being set to presentation allowed, and a parameter indicating that a selected request message should be used for the request;

originating a second call at the switch, in response to the forward call message, connecting the calling communication station and network equipment;

transmitting a request for audible caller identification information, from the network equipment, to the calling communication station in accordance with the customer selected request message; and transmitting the audible caller identification information to the called communication station in a format specified by the called party during the second call.

8. The method of claim 7, wherein the telephony database is further configured to determine if the Numbering Plan Area (NPA) of the caller identification information is invalid.

9. The method of claim 8, wherein the telephony database is further configured determine if the Numbering Plan Area (NPA) of the caller identification information is an approved NPA number.

10. The method of claim 9, wherein the telephony database is further configured determine if the Numbering Plan Area (NPA) of the caller identification information starts with a first digit set to a 0 or a 1.

11. The method of claim 7, wherein the telephony database is further configured determine if the caller identification contains a valid number of digits.

12. The method of claim 11, wherein the telephony database is further configured to determine whether the caller identification contains ten digits.

* * * * *